US011753017B2

(12) United States Patent
Lei et al.

(10) Patent No.: US 11,753,017 B2
(45) Date of Patent: Sep. 12, 2023

(54) SYSTEMS AND METHODS FOR PROVIDING OFF-TRACK DRIVABILITY GUIDANCE

(71) Applicant: Ford Global Technologies, LLC, Dearborn, MI (US)

(72) Inventors: Oliver Lei, Ontario (CA); Cynthia Neubecker, Westland, MI (US); Adil Siddiqui, Farmington Hills, MI (US); Robert Parenti, Dearborn, MI (US); Andrea Bowers Chowanic, West Bloomfield, MI (US)

(73) Assignee: Ford Global Technologies, LLC

( * ) Notice: Subject to any disclaimer, the term of this patent is extended or adjusted under 35 U.S.C. 154(b) by 0 days.

(21) Appl. No.: 17/515,764

(22) Filed: Nov. 1, 2021

(65) Prior Publication Data

US 2023/0137304 A1 May 4, 2023

(51) Int. Cl.
*B60W 40/068* (2012.01)
*B60W 40/04* (2006.01)

(52) U.S. Cl.
CPC .......... *B60W 40/068* (2013.01); *B60W 40/04* (2013.01); *B60W 2555/20* (2020.02)

(58) Field of Classification Search
CPC . B60W 40/04; B60W 2555/20; B60W 40/068
See application file for complete search history.

(56) References Cited

U.S. PATENT DOCUMENTS 9,672,734 B1   6/2017  Ratnaingam
9,903,728 B2 *  2/2018  Powers ................ G08G 1/0129

(Continued)

FOREIGN PATENT DOCUMENTS

DE     102012021420 A1 *  4/2014  ............ B60W 10/04
WO   WO-2014108556 A1 *  7/2014  .............. B60C 9/00
WO   WO-2018007330 A1 *  1/2018  ............. G01C 21/00

OTHER PUBLICATIONS

"Including weather forecasts in routing decisions of navigation systems for road vehicles: the users' view" by Michael Klafft 2017 36th International Conference of the Chilean Computer Science Society, pp. 1-5 pub. Oct. 1, 2017 (Year: 2017).*

(Continued)

*Primary Examiner* — Peter D Nolan
*Assistant Examiner* — Tanya C Sienko
(74) *Attorney, Agent, or Firm* — Joseph Zane; Eversheds Sutherland (US) LLP

(57) ABSTRACT

The disclosure generally pertains to systems and methods for providing off-road track drivability guidance. In an example scenario, a processor receives a sensor signal that is generated when a vehicle is driven on an off-road track. The processor evaluates the sensor signal to obtain information about a driving surface of the off-road track such as, a material composition, a gradient, and/or an amount of provided traction. The processor conveys the information to another processor (which may be a part of a server computer) that determines a drivability status of the off-road track based on the information about the driving surface and additional parameters, such as present and/or future weather conditions. The server computer may provide the drivability status in response to a query from a processor that is located in another vehicle (or in a personal communication device carried by a driver of the vehicle).

18 Claims, 8 Drawing Sheets

(56) References Cited

U.S. PATENT DOCUMENTS

| | | |
|---|---|---|
| 2016/0028824 A1 | 1/2016 | Stenneth et al. |
| 2018/0113450 A1 | 4/2018 | Sherony |
| 2020/0400459 A1 | 12/2020 | Chintakindi |
| 2022/0019233 A1* | 1/2022 | Parenti .................. G01C 21/20 |
| 2022/0097557 A1* | 3/2022 | Lee ........................ B60K 35/00 |
| 2022/0126864 A1* | 4/2022 | Moustafa ................. G06T 9/00 |

OTHER PUBLICATIONS

"A Vehicle Dispatch System Model based on Weather and Road Condition" by H. Shen and B. Zuo; 2009 Asia-Pacific Conference on Information Processing, pp. 244-247 (Year: 2009).*

Machine translation by IP.com of WO-2014108556-A1, downloaded Dec. 15, 2022 (Year: 2022).*

Machine translation by IP.com of DE102012021420-A1, downloaded Dec. 15, 2022 (Year: 2022).*

Juan (Susan) Pan et al., Proactive vehicle re-routing strategies for congestion avoidance, Research Gate, Department of Computer Science New Jersey Institute of Technology and Department of Computer Science University of Versailles Saint-Quentin-en-Yvelines, France, May 2012.

* cited by examiner

| Characterization Parameter | Example Characteristics |
|---|---|
| Grade | Easy, Moderate, Difficult, Severe, 2.5/5, 8/10 |
| Surface Composition | Dirt, Sand, Gravel, Pebbles |
| Weather (prevailing and/or recent) | Moderate rain 1 hour ago |
| Weather Forecast | Heavy rain expected in 4 hours |
| Weather Impact | Soggy. High water retention (clay soil) |
| Estimated Drivability | 80% before 1 PM @ 20 mph, 40% between 1 PM and 3 PM @ 10 mph |

FIG. 2

| Characterization Parameter | Estimated Drivability |
|---|---|
| Recent Off-Road Track Status Report | Moderately Usable, 90% Drivable |
| Description of Type of Vehicle Providing Status Report | SUV |
| Description of Type of Vehicle Requesting Recommendation | Sedan |
| Recommendation | Not Recommended, 30 % drivable over next 3 hours |
| Alternative Off-Road Track Having Similar Characteristics | 1 mile away |

FIG. 3

| Precipitation Level | Grade | Estimated Drivability |
|---|---|---|
| < 0.5 inch | > 3 | Sedan – 10% @ 5 mph<br>SUV – 50% @ 15 mph<br>ATV – 70% @ 20 mph |
| > 0.5 inch | < 3 | Sedan – 70% @ 20 mph<br>SUV – 90% @ 25 mph<br>ATV – 95% @ 30 mph |
| > 2.0 inch | Not Applicable | Not Recommended |

FIG. 4

SYSTEMS AND METHODS FOR PROVIDING OFF-TRACK DRIVABILITY GUIDANCE

BACKGROUND

Off-roading is popular among drivers who desire to get off the beaten path and take on challenges associated with driving over unpaved terrain. The nature of the unpaved terrain can vary from one path to another in terms of natural structure and under various circumstances (such as during rain or snow). It may be desirable for a driver to know beforehand what to expect of an off-road path if the driver desires to traverse the off-road path without encountering undesirable situations such as, for example, getting stuck in wet mud.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

FIG. 2 shows a first table that includes some example parameters that may be used to characterize an off-road track in accordance with an embodiment of the disclosure.

FIG. 3 shows a second table that includes some example parameters pertaining to a drivability of an off-road track in accordance with an embodiment of the disclosure.

FIG. 4 shows a third table pertaining to drivability of an off-road track by various example vehicles in accordance with an embodiment of the disclosure.

DETAILED DESCRIPTION

Overview

Figure 1:
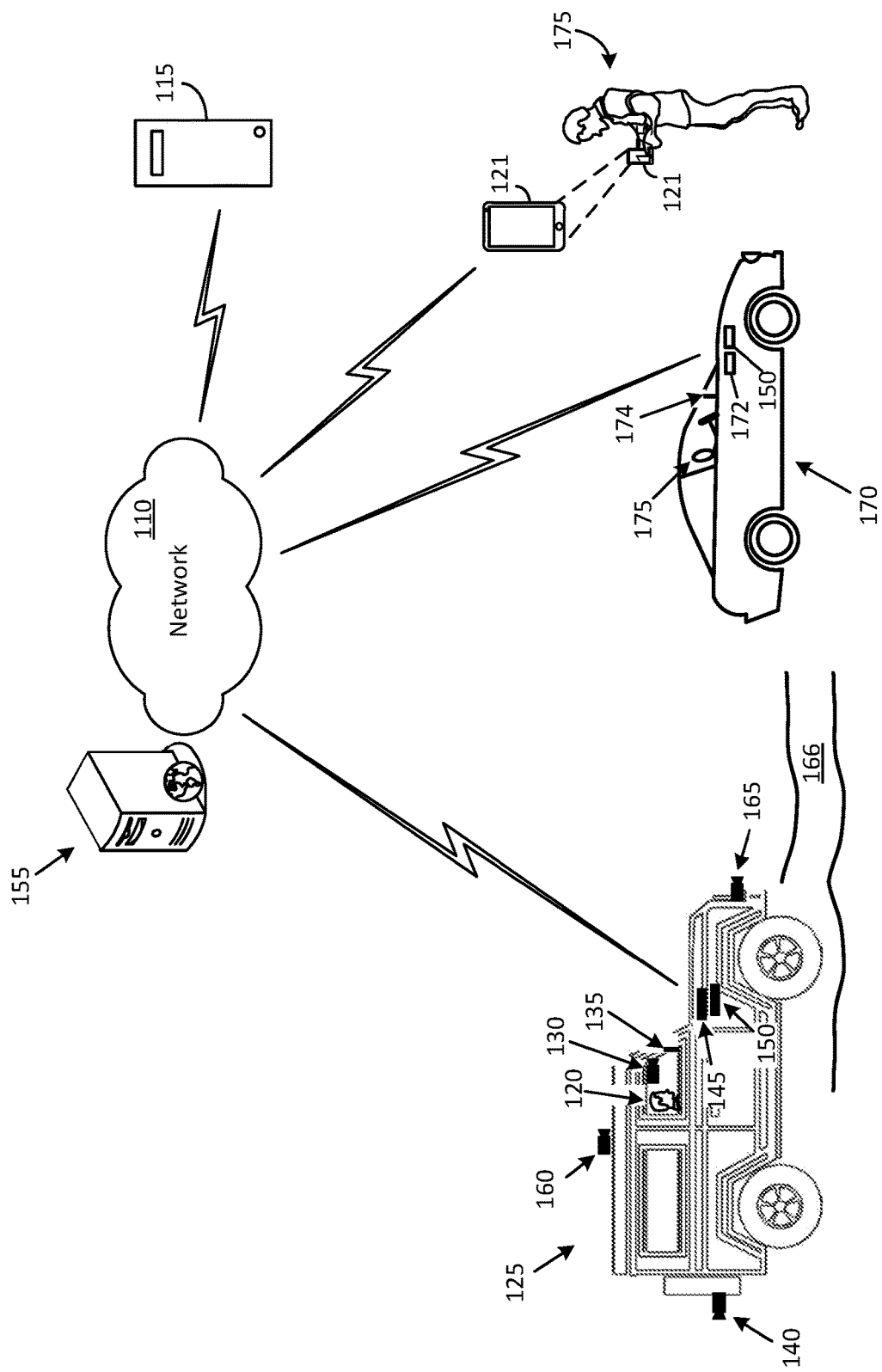
FIG. 1 illustrates an example scenario in accordance with an embodiment of the disclosure, where a first vehicle provides information about an off-road track that may be useful to a driver of a second vehicle.

In terms of a general overview, certain embodiments described in this disclosure are directed to systems and methods for providing off-road track drivability guidance to a driver of a vehicle desiring to use an off-road track. In an example scenario, a first processor in a first vehicle receives a sensor signal that is generated in response to driving the first vehicle on an off-road track. The first processor evaluates the sensor signal to obtain information about a driving surface of the off-road track such as, for example, a material composition of the driving surface (mud, clay, sand, rocks, pebbles, etc.), a gradient of the driving surface (steep slope, level, etc.), and/or a traction provided by the driving surface (firm, slick, slippery, etc.). The first processor conveys the information to a second processor that may be a part of a server computer. The second processor may determine a drivability status of the off-road track based on a multifactor evaluation procedure that includes evaluating the information provided by the first processor and additional parameters, such as, for example, present and/or future weather conditions applicable to the off-road track. The second processor may provide the drivability status in response to a query from a third processor that may be a part of a second vehicle or a personal communication device (a smartphone, for example) carried by a driver of the second vehicle.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the described example embodiments but should be defined only in accordance with the claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular device or component may be performed by another device or component. Also, while specific device characteristics have been described, embodiments of the disclosure may relate to numerous other device characteristics.

Furthermore, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art. For example, the word "vehicle" as used in this disclosure encompasses various types of vehicles such as, for example, a sedan, a sports utility vehicle, a truck, an all-terrain vehicle, or a van. The word "off-road" as used herein refers to any type of track, path, or ground that is unpaved and has a driving surface containing natural materials such as mud, clay, sand, gravel, snow, ice, and/or rocks. Some of these off-road tracks may be natural, while some others may be man-made for specific purposes such as for racing, amusement, driver training, and driving challenges. The word "image" as used herein can be a standalone digital image or an image that is a part of a video clip or video stream. Words such as "detector" and "sensor" may be used interchangeably and must be understood in the context in which used. Words such as "information" and "data" may be used interchangeably and must be understood in the context in which used. It must be understood that words such as "implementation," "scenario," "case," "application," "procedure," and "situation" that are used herein are shortened versions of phrases that include either of the following suffixes: "in accordance with the disclosure," or "in accordance with an embodiment of the disclosure." It should also be understood that the word "example" as used herein is intended to be non-exclusionary and non-limiting in nature.

FIG. 1 illustrates a vehicle 125 that may be any of various types of vehicles such as, for example, a sedan, a sports utility vehicle (SUV), an all-terrain vehicle (ATV), a truck, or a van. In the illustrated scenario, the vehicle 125 is operated by a driver 120 who enjoys driving the vehicle 125 over off-road tracks at various times and under various driving conditions (weekdays, weekends, good weather, bad weather, etc.). The vehicle 125 can include a number of components such as, for example, a vehicle computer 145, an infotainment system 135, an off-road track operations system 150, and various sensors and detection devices.

The vehicle computer 145 may perform various functions such as controlling engine operations (fuel injection, speed control, emissions control, braking, etc.), managing climate controls (air conditioning, heating etc.), activating airbags, issuing warnings (check engine light, bulb failure, low tire pressure, vehicle in blind spot, etc.), and activating various vehicle components such as the horn and lights.

The infotainment system 135 can include elements such as, for example, a radio, an MP3 player, a global positioning system (GPS) device, a clock, and a display screen. The infotainment system 135, which is communicatively coupled to the off-road track operations system 150, can further include a graphical user interface (GUI) or a human machine interface (HMI) that is displayed on the display screen. The GUI or HMI accepts input from the driver 120 and/or displays various items pertaining to operations related to off-road tracks in accordance with the disclosure. An example item that may be input by the driver 120 into the GUI or HMI is information pertaining to a driving surface of an off-road track 166. Such information may be based, for example, on observations made by the driver 120, such as, for example, a visual observation of the driving surface and/or a physical examination of the driving surface (such as, for example, examining a material of the driving surface by hand, walking on the driving surface etc.). Example items that may be displayed on the GUI of the infotainment system 135 can be a navigation map and/or a weather map that may be used by the driver 120 when traversing the off-road track 166.

The off-road track operations system 150 may be configured to communicate via a network 110 with various devices such as, for example, a server computer 115 and a cloud computer 155. The network 110 may include any one, or a combination of networks, such as a local area network (LAN), a wide area network (WAN), a telephone network, a cellular network, a cable network, a wireless network, and/or private/public networks such as the Internet. For example, the network 110 may support communication technologies such as Wi-Fi, Wi-Fi direct, Ultra-Wideband (UBW), machine-to-machine communication, and/or man-to-machine communication.

At least one portion of the network 110 includes a wireless communication link (a WiFi link, for example), that allows the off-road track operations system 150 to communicate with the server computer 115 and/or the cloud computer 155. The network 110 may also support a wireless communication link (a cellular link, for example) that allows the server computer 115 and/or the cloud computer 155 to communicate with a personal communication device (not shown) carried by the driver 120 of the vehicle 125. The personal communication device can be any of various devices such as, for example, a smartphone, a tablet computer, a phablet (phone plus tablet), a wearable computer, or a laptop computer.

The vehicle 125 may also include various sensors and detection devices that are communicatively coupled to the off-road track operations system 150 and/or the vehicle computer 145. A few examples of such sensors and detection devices can include a camera, an accelerometer, a magnetometer, a pressure transducer, a speed sensor, an ultrasonic sensor, a radar sensor, a light detection and ranging (LIDAR) detector, and a global positioning system (GPS) device. Sensors and detectors such as the pressure transducer, the accelerometer, and the magnetometer, the pressure transducer, and the speed sensor, may be configured to generate sensor signals that reflect various operating conditions of the vehicle 125 that may be evaluated by the off-road track operations system 150 to obtain information about a driving surface of the off-road track 166.

The various operating conditions of the vehicle 125 can include, for example, an angular orientation of a chassis portion of the vehicle 125 with respect to a ground surface (yaw, pitch, roll, etc.), steering characteristics, speed characteristics, and/or braking characteristics. The angular orientation of the chassis portion of the vehicle 125 with respect to the ground surface can provide information about the steepness of a slope in the off-road track 166 and/or a bend in the contour of the off-road track 166. The steering characteristics can provide information about the surface of the off-road track 166 (slippery gravel surface, loose sand surface, grippy mud surface, etc.). The speed characteristics and/or the braking characteristics can provide information about the difficulty in driving over the off-road track 166 (nature of the driving surface, negotiating bends, negotiating slopes, negotiating curves, etc.). Various operating conditions of the vehicle 125 may also be obtained from the vehicle computer 145, such as, for example, gear settings, gear shifts, and engine revolutions per minute (rpm).

In the illustrated example, the detection devices include a camera 130, a camera 165, a camera 140, and a camera 160. The camera 130, which can be mounted facing forwards on a rear-view mirror of the vehicle 125 or a dashboard of the vehicle 125, and the camera 165, which can be mounted on a front bumper of the vehicle 125, are arranged to capture images of objects located in front of the vehicle 125 and of the terrain of the off-road track 166 ahead of the vehicle 125. The terrain may, for example, include a ground area ahead, a hill, some bushes, a tree, and other objects that the driver 120 has to watch out for and perform actions such as, for example, engage a lower gear, swerve, or circumnavigate. The camera 140, which can be mounted on a rear bumper of the vehicle 125, is arranged to capture images of objects located behind the vehicle 125 and of the terrain below the vehicle 125. In one implementation, the camera 165 and/or the camera 140 can be arranged to obtain images of the wheels of the vehicle 125 that may be evaluated by the off-road track operations system 150 to identify a nature of the driving surface (gravel, sand, etc.). The camera 160 may be mounted on the roof of the vehicle 125 to capture images of objects located at various locations around the vehicle 125.

In an example implementation, the camera 160 is an imaging system containing multiple cameras arranged to provide a 360° view all around the vehicle 125 and to convey to the off-road track operations system 150, captured images of multiple objects all around the vehicle 125 and/or the terrain around the vehicle 125. The camera 130, the camera 165, the camera 140, and/or the camera 160 can be any of various types of cameras, including, for example, a digital camera that captures digital images, a video camera that produces video clips and/or streaming video, and a night-vision camera that captures images and/or video in low light conditions. The images, video, and/or streaming video may be conveyed to the off-road track operations system 150. The off-road track operations system 150 may evaluate the images, video, and/or streaming video for various purposes such as, for example, to determine a nature of the driving surface of the off-road track 166.

The server computer 115 and the cloud computer 155 may be configured to communicate with the off-road track operations system 150, the vehicle computer 145, and/or the infotainment system 135 via wireless technologies such as, for example, Wi-Fi, Ultra-Wideband (UWB), or cellular communications. The server computer 115 and the cloud computer 155 may be further configured to communicate with another off-road track operations system 150 provided in another example vehicle 170.

The vehicle 170 may be any of various types of vehicles such as, for example, a sedan, an SUV, an ATV, a truck, or a van. The driver 175 of the vehicle 170 also enjoys driving the vehicle 170 over off-road tracks at various times and under various driving conditions (weekdays, weekends, good weather, bad weather, etc.).

However, unlike the vehicle 125, which in the illustrated example is an SUV, the vehicle 170 is a sedan that may have certain limitations in terms of traversing the off-road track 166. For example, the off-road track 166 may include a steep slope that may be untraversable by the sedan, and/or have a driving surface that becomes untraversable by the sedan as a result of rain or snow, for example. In another example scenario, the vehicle 170 is substantially similar to the vehicle 125 and may provide substantially similar driving capabilities.

The driver 175 of the vehicle 170 may operate a personal communication device 121 for communicating via the network 110 with various devices such as, for example, the server computer 115 and/or the cloud computer 155 for various purposes including for transmitting a query to inquire about a traversability of the off-road track 166. The driver 175 may include in the query, some information about the vehicle 170, such as, for example, a model and a make of the vehicle 170 (Ford Explorer, for example) and a type of the vehicle 170 (SUV, for example). The personal communication device 121 can be any of various devices such as, for example, a smartphone, a tablet computer, a phablet (phone plus tablet), a wearable computer, or a laptop computer.

The vehicle 170 can include components such as, for example, a vehicle computer 172, an infotainment system 174, and the off-road track operations system 150. The infotainment system 174 can include elements such as, for example, a radio, an MP3 player, a GPS device, a clock, and a display screen. The infotainment system 174, which is communicatively coupled to the off-road track operations system 150 in the vehicle 170, can further include a GUI or an HMI that is displayed on the display screen. The GUI or HMI accepts input from the driver 175 and/or displays various items pertaining to operations related to off-road tracks. An example item that may be input by the driver 175 into the HMI is a query about the traversability of the off-road track 166. The query may be transmitted to the server computer 115 by the off-road track operations system 150. The off-road track operations system 150 may automatically append to the query, if not already provided by the driver 175, some information about the vehicle 170 (make, model, type, etc.).

Alternatively, the query may be transmitted by the driver 175 via the personal communication device 121. The driver 175 may include in the query, some information about the vehicle 170 (make, model, type, etc.). The server computer 115 may respond to the query by providing a drivability status of the off-road track 166 that has been determined on the basis of information provided in the query and on factors such as, for example, a weather condition (current weather and/or forecasted weather) applicable to the off-road track 166. The drivability status may be displayed on the display screen of the infotainment system 174 and/or on the personal communication device 121.

In some cases, the driver 175 may decide to carry out one or more of various actions, based on the drivability status of the off-road track 166 that is provided by the server computer 115. For example, in one case, the driver 175 may decide to use a different type of vehicle (an SUV instead of a sedan, for example). In another case, the driver 175 may decide to retain the type of vehicle 170. In another case, the driver 175 may decide to modify certain features of the vehicle 170 (replace regular tires with snow tires or off-road tires, for example). In yet another case, the driver 175 may decide to change a timing of a trip to the off-road track 166 (postpone, cancel, etc.).

In an example operation that is performed in accordance with disclosure, the off-road track operations system 150 of the vehicle 125 collects information pertaining to a driving surface of the off-road track 166 and conveys the information to the server computer 115. The information, which may be derived by evaluating various types of sensor signals provided to the off-road track operations system 150 by various sensors in the vehicle 125, can include, for example, a material composition of the driving surface (mud, clay, sand, rocks, pebbles, etc.), a gradient of the driving surface (steep slope, level, etc.), and/or a traction provided by the driving surface (firm, slick, slippery, etc.).

The server computer 115 receives the information from the off-road track operations system 150 and executes a multifactor evaluation procedure for determining a drivability status of the off-road track 166. The multifactor evaluation procedure can involve evaluating the information provided by the off-road track operations system 150 in view of various factors such as, for example, in view of weather conditions applicable to the off-road track 166. The weather conditions may include current weather conditions, previous weather conditions, and/or future weather conditions.

In a first example implementation in accordance with the disclosure, the information provided by the off-road track operations system 150 to the server computer 115 is in the form of unprocessed sensor signals. The unprocessed sensor signals are evaluated by the server computer 115 to derive information about the driving surface of the off-road track 166 (firm, slick, steep slope, gravelly, etc.) and execute the multifactor evaluation (evaluating the information provided by the off-road track operations system 150 in view of a weather factor, for example) to determine a drivability status of the off-road track 166.

In a second example implementation in accordance with the disclosure, the off-road track operations system 150 evaluates the sensor signals to derive information about the driving surface of the off-road track 166 (firm, slick, steep slope, gravelly, etc.) and conveys the information to the server computer 115. The server computer 115 executes the multifactor evaluation (evaluating the information provided by the off-road track operations system 150 in view of a weather factor, for example) to determine a drivability status of the off-road track 166.

The off-road track operations system 150 provided in the vehicle 170 can operate in manner that is substantially similar to the manner described above with respect to the off-road track operations system 150 provided in the vehicle 125. The server computer 115 may use information pertaining to the driving surface of the off-road track 166 (when, and if, the vehicle 170 traverses the off-road track 166) that is provided by the off-road track operations system 150 of the vehicle 170 for various purposes such as, for example, to modify, revise, update, and/or corroborate the information provided by the off-road track operations system 150 of the vehicle 125.

In an example scenario, the server computer 115 may respond to a query received from the off-road track operations system 150 of the vehicle 170 by providing a drivability status of the off-road track 166 that has been determined on the basis of information provided by the off-road track operations system 150 of the vehicle 125.

FIG. 2 shows a table 200 that includes some example parameters that may be used to characterize the off-road track 166 in accordance with an embodiment of the disclosure. A first example parameter listed in column 205 is a grade that may be assigned by the server computer 115 to the off-road track 166. The grades may be assigned based on one or more characteristics of the off-road track 166 such as, for example, a gradient of a slope, an acuteness of a bend, a curvature of a segment, and/or a distance parameter. The grades can be defined in various ways such as, for example, by words (easy, moderate, difficult, severe, etc.) and/or by numerical ratings (2.5 on a scale that extends from zero to 5, 8 on a scale that extends from zero to 10, etc.).

A second example parameter listed in column 205 is a surface composition of the off-road track 166. The surface composition may be determined by the server computer 115 based on information and/or sensor signals provided by the off-road track operations system 150. The information and/or sensor signals may indicate that the surface composition of the off-road track 166 is attributable to dirt, sand, gravel, and/or pebbles, for example.

A third example parameter listed in column 205 pertains to prevailing weather and/or recent weather conditions. Information related to prevailing weather and/or recent weather conditions may be obtained by the server computer 115 from various sources such as, for example, from the driver 120 of the vehicle 125, the off-road track operations system 150 in the vehicle 125, and/or a weather bureau computer. The weather information can pertain to events such as a rainfall, a hail storm, a snow storm, and an ice storm, for example. An example description of a recent weather event may be provided by the server computer 115 as follows: "Moderate rain 1 hour ago."

In an example embodiment, the server computer 115 may apply a greater weight on weather information provided by the driver 120 and/or the off-road track operations system 150 when the vehicle 125 is traversing the off-road track 166 than on weather information received from the weather bureau computer, for example. The rationale behind doing so can be attributed to factors such as rainfall microbursts that may happen within a small area and may be unpredictable when based on conventional weather forecasting methods.

In an example implementation in accordance with the disclosure, the weather information provided by the off-road track operations system 150 of the vehicle 125 may be confined to an area that is defined by a geofence extending in various directions with respect to the vehicle 125 (all around, extending in front, extending towards the rear, confined to the off-road track 166, etc.). In one case, the geofence is defined automatically by the off-road track operations system 150, and information about the geofence conveyed to the server computer 115. In another case, the geofence may be defined by the off-road track operations system 150 based on input provided by the driver 120 of the vehicle 125 (via the HMI of the infotainment system 135, for example). The input provided by the driver 120 regarding the geofence may be conveyed to the server computer 115 by the off-road track operations system 150.

A fourth example parameter listed in column 205 pertains to a weather forecast. The weather forecast may be obtained by the server computer 115 from various sources such as, for example, a weather bureau computer and/or the cloud computer 155. The weather forecast can pertain to events such as a rainfall, a hail storm, a snow storm, and an ice storm, for example. In an example implementation, the weather forecast may be limited to an area that is defined by the geofence described above. An example description of a weather forecast may be provided by the server computer 115 as follows: "Heavy rain expected in 4 hours."

A fifth example parameter listed in column 205 pertains to weather impact. The weather impact may be obtained by the server computer 115 from various sources such as, for example, the driver 120 of the vehicle 125, the off-road track operations system 150, a weather bureau computer, and/or the cloud computer 155. In an example implementation, the weather impact may be limited to an area that is defined by the geofence described above. The weather impact generally pertains to weather-related events that affect the driving surface of the off-road track 166 (water accumulation due to a rainfall, hailstone layer due to a hail storm, snow deposit due to a snow storm, ice deposit due to an ice storm, etc.).

An example description of a weather impact upon the off-road track 166 may be provided by the server computer 115 as follows: "Soggy. High water retention." The description may be based on the server computer 115 determining that the material composition of the driving surface of the off-road track 166 has a high clay content and a rainfall has occurred recently.

A sixth example parameter listed in column 205 pertains to an estimated drivability of the off-road track 166. The server computer 115 may determine the estimated drivability of the off-road track 166 based on characteristics such as the ones described above with respect to table 200. An example description of an estimated drivability of the off-road track 166 may be provided by the server computer 115 as follows: "80% before 1 PM @ 20 mph, 40% between 1 PM and 3 PM @ 10 mph."

FIG. 3 shows a table 300 that includes some example parameters pertaining to drivability of the off-road track 166 in accordance with an embodiment of the disclosure. A first example parameter listed in column 305 is a recent status report associated with the off-road track 166. The status report may provide a drivability status of the off-road track 166 based on a determination made by the server computer 115. The determination may be made by evaluating information provided by the off-road track operations system 150 of the vehicle 125 regarding the driving surface of the off-road track 166. Example descriptions of a status report of the off-road track 166 may be provided by the server computer 115 as follows: "Moderately usable" and "90% drivable."

A second example parameter listed in column 305 is a description of a type of the vehicle (model and/or make) providing information for the status report. In the illustrated example of FIG. 1, the vehicle 125 providing information to the server computer 115 is an SUV (Ford Explorer, for example). In other cases, the vehicle providing information to the server computer 115 can be, for example, a sedan, a truck, an all-terrain vehicle (ATV), a vehicle having a four-wheel drive, a vehicle having a two-wheel drive, a front-wheel drive vehicle, or a rear-wheel drive vehicle. The nature of the information provided to the server computer 115 can vary from one type of vehicle to another. For example, an ATV may find the driving surface of the off-road track 166 quite drivable whereas a sedan having front-wheel drive may find the off-road track 166 difficult to traverse. The server computer 115 is configured to interpret the information about the driving surface of the off-road track 166 in view of the type of vehicle providing the information.

A third example parameter listed in column 305 is a description of a type of the vehicle (model and/or make) querying about the traversability of the off-road track 166. In the illustrated example of FIG. 1, the vehicle 170 sending the query to the server computer 115 is a sedan (Ford Fusion, for example). In other cases, the vehicle sending the query to the server computer 115 can be, for example, another SUV, a truck, an all-terrain vehicle (ATV), a vehicle having a four-wheel drive, a vehicle having a two-wheel drive, a front-wheel drive vehicle, or a rear-wheel drive vehicle. The nature of the information provided by the server computer 115 in response to the query can vary from one type of vehicle to another. In this case, the drivability status of the off-road track 166 as determined from the information provided by the vehicle 125 (an SUV) may be suitably tailored by the server computer 115 in view of the query being received from the vehicle 170 that is a sedan.

A fourth example parameter listed in column 305 is a recommendation provided by the server computer 115 in response to a query. The information provided by the vehicle 125 (an SUV) to the server computer 115 may be tailored by the server computer 115 for use by the vehicle 170 (a sedan) and combined with other factors such as, for example, a weather forecast. Example recommendations provided by the server computer 115 can be as follows: "Not recommended" or "30% drivable over next 3 hours" (in view of an expected rain fall after 3 hours).

A fifth example parameter listed in column 305 is a recommendation to use an alternative off-road track. The alternative off-road track may be recommended, for example, because the vehicle 170 (a sedan) may find it difficult to traverse the off-road track 166, particularly in view of the weather forecast. The server computer 115 may provide details about the alternative off-road track such as, for example, a distance from a current location of the vehicle 170, a distance from the off-road track 166, and the drivability status of the alternative off-road track.

FIG. 4 shows a table 400 pertaining to drivability of the off-road track 166 by various types of vehicles in accordance with an embodiment of the disclosure. Some example parameters listed in column 405 pertain to a precipitation level applicable to the off-road track 166; in column 410, to a grade of the off-road track 166; and in column 415, to an estimated drivability of the off-road track 166 in view of the precipitation level and the grade.

A first row 420 of the table 400 indicates an estimated drivability of the off-road track 166 in view of a precipitation level that is below 0.5 inch and a grade greater than 3. The estimated drivability may be indicated in various ways such as, for example, as follows: "Sedan—10% @ 5 mph," "SUV—50% @ 15 mph," and "ATV—70% @ 20 mph."

A second row 425 of the table 400 indicates an estimated drivability of the off-road track 166 in view of a precipitation level that is greater than 0.5 inch and a grade less than 3. The estimated drivability may be indicated in various ways such as, for example, as follows: "Sedan—70% @ 20 mph," "SUV—90% @ 25 mph," and "ATV—95% @ 30 mph."

A third row 430 of the table 400 indicates an estimated drivability of the off-road track 166 in view of a precipitation level exceeding 2 inches. The estimated drivability may be indicated by the server computer 115 in various ways such as, for example, in this case, as follows: "Not recommended."

Figure 5:
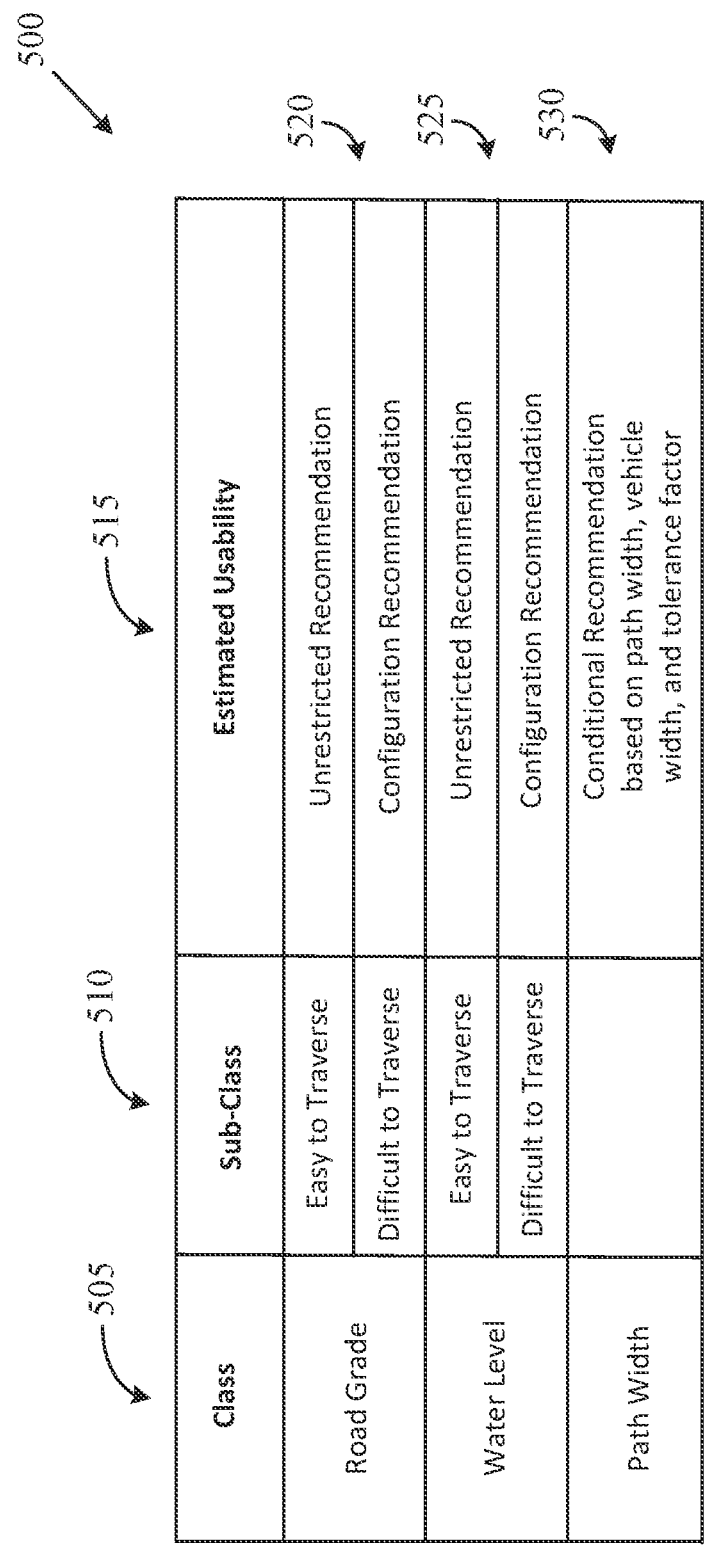
FIG. 5 shows a fourth table pertaining to recommendations for use of an off-road track based on some example conditions in accordance with an embodiment of the disclosure.

FIG. 5 shows a table 500 pertaining to recommendations provided by the server computer 115 for use of the off-road track 166 based on some example conditions in accordance with an embodiment of the disclosure. Some example parameters listed in column 505 pertain to a class associated with the off-road track 166; in column 510, to a sub-class associated with the off-road track 166; and in column 515, to an estimated drivability of the off-road track 166 in view of the class and sub-class of the off-road track 166.

A first row 520 of the table 500 indicates an estimated drivability of the off-road track 166 in view of a road grade class having two sub-classes. The server computer 115 may indicate an estimated usability of a road grade sub-class that is defined as "Easy to traverse" in the following manner: "Unrestricted recommendation" and a road grade sub-class that is defined as "Difficult to traverse" in the following manner: "Recommended subject to vehicle configuration." In an example implementation, the server computer 115 may evaluate a drivability of a type of vehicle on the off-road track 166 based on the drivability status of the off-road track 166. Based on the evaluation, the server computer 115 may recommend use of this type of vehicle, subject to the drivability status exceeding a threshold reference value.

Some example vehicle configurations that may be recommended are as follows: a set of low gears for traversing a steep slope, manual transmission, four-wheel drive, high suspension struts, heavy damping in struts, and/or a rollbar in the cabin. In some cases, the server computer 115 may evaluate the vehicle 170 that is sending the query regarding the drivability status of the off-road track 166, which in this example case, is a sedan, and provide a notification that the vehicle 170 is unsuitable for traversing the off-road track 166 when the off-road track 166 is difficult to traverse.

A second row 525 of the table 500 indicates an estimated drivability of the off-road track 166 in view of a level of water that has accumulated on the off-road track 166. The water level may vary in accordance with the source, such as, for example, a small amount of water due to a light rainfall and a large amount of water due to a flooded stream. The server computer 115 may indicate an estimated usability of the off-road track 166 in a sub-class labeled "Easy to traverse" (low amount of water accumulation) in the following manner: "Unrestricted recommendation." The server computer 115 may indicate an estimated usability of the off-road track 166 in a sub-class labeled as "Difficult to traverse," (large amount of water accumulation) in the following manner: "Recommended subject to vehicle configuration." Some example vehicle configurations that may be recommended are as follows: high suspension struts and/or exhaust pipe vent extending above the hood of the vehicle 170.

In some cases, the server computer 115 may evaluate the vehicle 170 that is sending the query regarding the drivability status of the off-road track 166, which in this example case, is a sedan, and provide a notification that the vehicle 170 is unsuitable for traversing the off-road track 166 when the off-road track 166 has a large amount of water.

A third row 530 of the table 500 indicates an estimated drivability of the off-road track 166 in view of a path width of the driving surface of the off-road track 166. When the path width is wider than a threshold width, the server computer 115 may indicate an estimated usability of the off-road track 166 in the following manner: "Easy to traverse."

The threshold width may be defined in one case by the width of the wheel-base of the vehicle 170. A tolerance factor may be added in some cases to the width of the wheel-base of the vehicle 170 so as to allow the driver 175 a certain level of maneuverability when driving the vehicle 170 on the off-road track 166. When the path width is narrower than the threshold width, the server computer 115 may provide a notification that the vehicle 170 is unsuitable for traversing the off-road track 166 in view of the width of the wheel-base of the vehicle 170 exceeding the path width of the off-road track 166.

Figure 6:
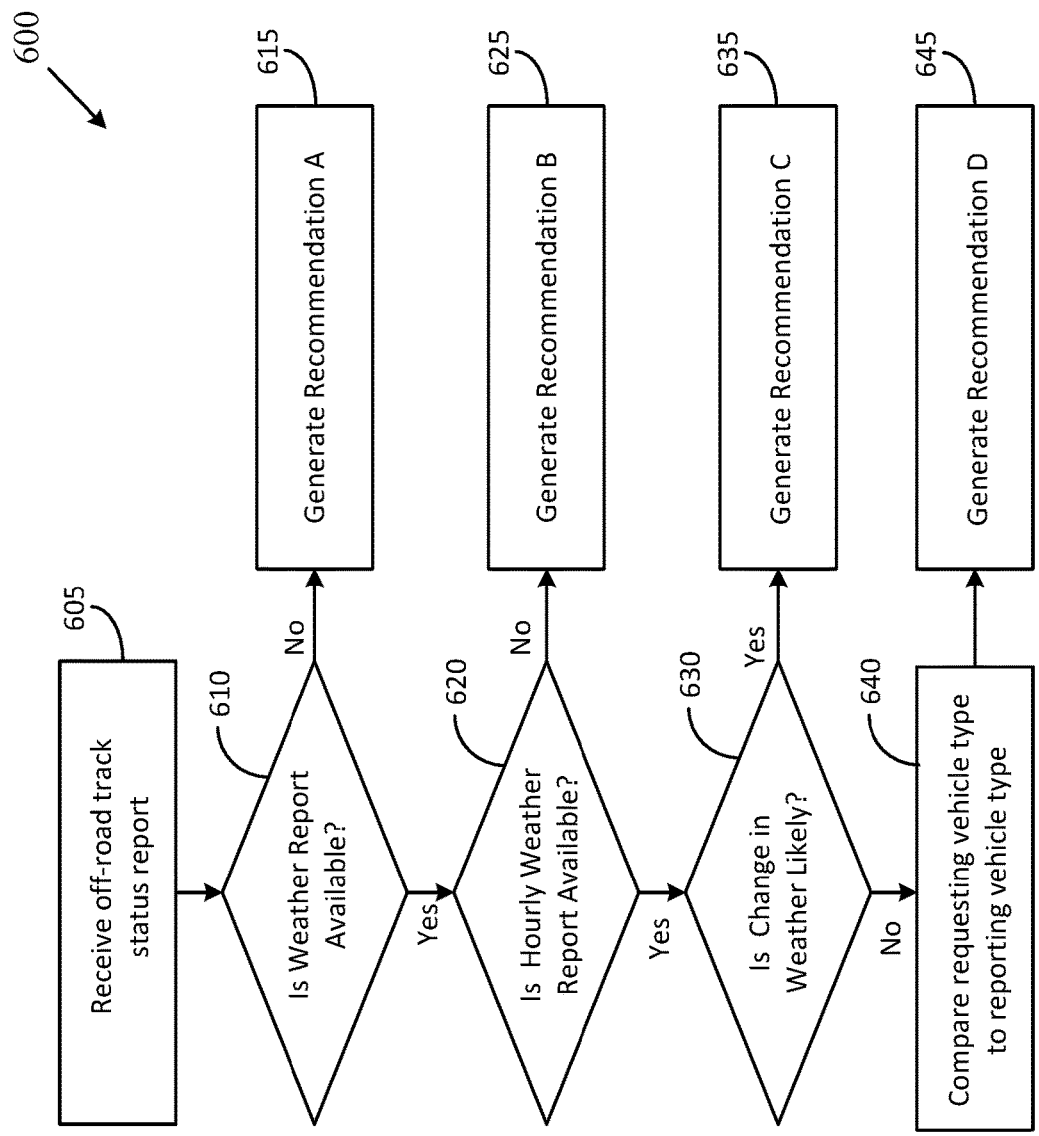
FIG. 6 shows a flowchart of an example method to generate a recommendation for use of an off-road track in accordance with an embodiment of the disclosure.

FIG. 6 shows a flowchart 600 of an example method to generate a recommendation for use of the off-road track 166 in accordance with an embodiment of the disclosure. The flowchart 600 illustrates a sequence of operations that can be implemented in hardware, software, or a combination thereof. In the context of software, the operations represent computer-executable instructions stored on one or more non-transitory computer-readable media such as a memory component that is a part of the server computer 115, that, when executed by one or more processors such as a processor that is a part of the server computer 115, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be carried out in a different order, omitted, combined in any order, and/or carried out in parallel. The description below may make reference to certain components and objects shown in FIGS. 1-5, but it should be understood that this is done for purposes of explaining certain aspects of the disclosure and that the description is equally applicable to many other embodiments.

At block 605, the server computer 115 may receive information about a driving surface of the off-road track 166. The information may be provided by the off-road track operations system 150, via the network 110, in the manner described above with respect to the various example scenarios. In one example scenario, the information provided by the off-road track operations system 150 of the vehicle 125 may be confined to an area that is defined by a geofence.

At block 610 a determination is made whether a weather report is available. The determination may be made by the server computer 115 based on communications with a weather bureau computer and/or the off-road track operations system 150 of the vehicle 125. In one scenario, a weather report may be unavailable. If so, at block 615, the server computer 115 may generate a recommendation that is labeled in FIG. 6 as "Recommendation A." Recommendation A may be based primarily on the information provided by the off-road track operations system 150 of the vehicle 125, by the driver 120 of the vehicle 125, and/or on information provided by other drivers or off-road track operations systems in other vehicles. Some example recommendations are described above with reference to FIGS. 2 through 5.

If, at block 610, it is determined that a weather report is available, at block 620, a determination is made whether the weather report is an hour-by-hour weather report. If the weather report is not an hour-by-hour weather report, at block 625, the server computer 115 may generate a recommendation that is labeled in FIG. 6 as "Recommendation B."

Recommendation B may be based on a multifactor evaluation that includes the information provided by the off-road track operations system 150 of the vehicle 125 and some weather information. The weather information can be based, for example, on historic weather data and/or information pertaining to an expected weather condition at the off-road track 166. The weather information may also be confined to a geofence defined around the vehicle 125 and/or based on GPS coordinates of the location of the vehicle 125.

If, at block 620, it is determined that an hour-by-hour weather report is available, at block 630, a determination is made whether the weather is likely to change over the next few hours, for example. The determination may be made by the server computer 115 based on communications with a weather bureau computer and/or the off-road track operations system 150 of the vehicle 125. In one scenario, a change in weather may be likely. If so, at block 635, the server computer 115 may generate a recommendation that is labeled in FIG. 6 as "Recommendation C."

Recommendation C may be based on the information provided by the off-road track operations system 150 of the vehicle 125 and/or on the weather data. Some example recommendations are described above with reference to FIGS. 2 through 5.

If, at block 630, it is determined that the weather is not likely to change, at block 640, the server computer 115 may compare the type of vehicle providing the information about the driving surface of the off-road track 166 to the type of vehicle inquiring about the traversability of the off-road track 166. In the example described above, the type of vehicle providing the information about the driving surface of the off-road track 166 is an SUV and the type of vehicle inquiring about the traversability of the off-road track 166 is a sedan.

At block 645, the server computer 115 may generate a recommendation that is labeled in FIG. 6 as "Recommendation D." Recommendation D may be based on the information provided by the off-road track operations system 150 of the vehicle 125, the hourly weather report, and the differences in the two types of vehicles. Some example recommendations are described above with reference to FIGS. 2 through 5, particularly FIG. 3 and FIG. 4.

Figure 7:
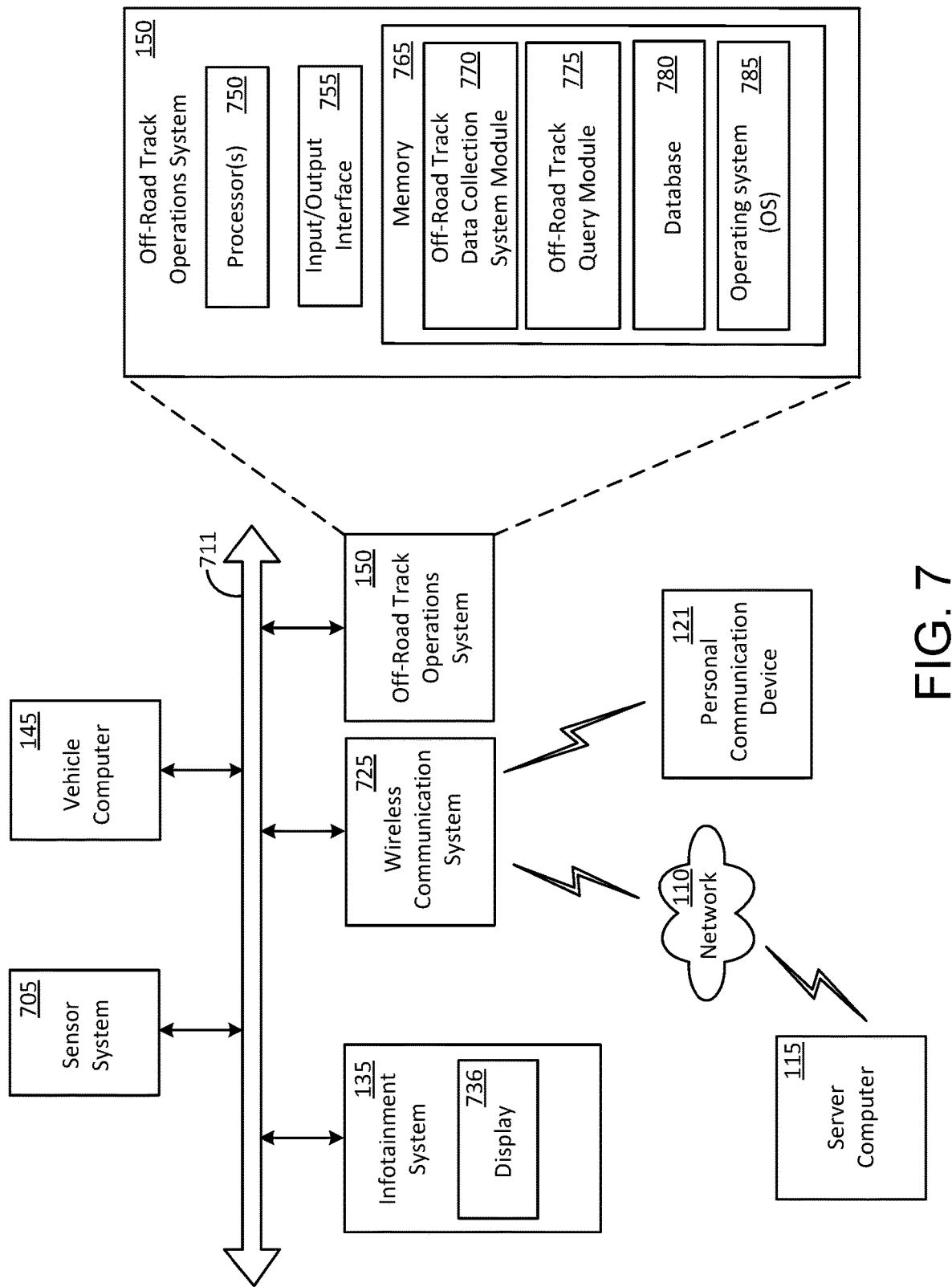
FIG. 7 illustrates some example components that may be included in a vehicle in accordance with an embodiment of the disclosure.

FIG. 7 illustrates some example components that may be included in accordance with an embodiment of the disclosure. The description below is provided with respect to the example vehicle 125. However, it must be understood that the description is equally applicable to the vehicle 170. The example components in the vehicle 125 can include the vehicle computer 145, a sensor system 705, the infotainment system 135, a wireless communication system 725, and the off-road track operations system 150. These components, and other components (not shown), are communicatively coupled to each other via a bus 711.

The bus 711 can be implemented using one or more of various wired and/or wireless technologies. For example, the bus 711 can be a vehicle bus that uses a controller area network (CAN) bus protocol, a Media Oriented Systems Transport (MOST) bus protocol, and/or a CAN flexible data (CAN-FD) bus protocol. Some or all portions of the bus 711 may also be implemented using wireless technologies such as Bluetooth®, ZigBee®, Ultra-Wideband (UWB), near-field-communications (NFC), cellular, Wi-Fi, Wi-Fi direct, machine-to-machine communication, and/or man-to-machine communication.

The sensor system 705 may include various sensors and detection devices that are communicatively coupled to the off-road track operations system 150 and/or the vehicle computer 145. A few examples of such sensors and detection devices can include a camera, an accelerometer, a magnetometer, an ultrasonic sensor, a radar detector, a LIDAR detector, a global positioning system (GPS), and a vehicle speed sensor.

The infotainment system 135 can be an integrated unit that includes various components such as, for example, a radio, an MP3 player, and a display 736. The display 736 may include a GUI or an HMI for use by the driver 120. The GUI or HMI, may, for example, accept input from the driver 120 and/or display various items pertaining to operations related to off-road tracks. An example item that may be input by the driver 120 into the GUI or HMI is information pertaining to a driving surface of the off-road track 166. Such information may be based, for example, on observations made by the driver 120, such as, for example, a visual observation of the driving surface and/or a physical examination of the driving surface (such as, for example, examining a material of the driving surface by hand, walking on the driving surface etc.). Example items that may be displayed on the GUI or HMI can be a navigation map and/or a weather map that may be used by the driver 120 when driving on the off-road track 166 and elsewhere.

The wireless communication system 725 may include elements such as, for example, wireless transmitters and receivers that enable communications between the off-road track operations system 150 and various devices, such as, for example, a personal communication device of the driver 120, the personal communication device 121 of the driver 175, the cloud computer 155, and/or the server computer 115.

The off-road track operations system 150 may include a processor 750, an input/output interface 755, and a memory 765. In some implementations, some or all parts of the off-road track operations system 150 (such as, for example, the processor 750 and the memory 765) may be incorporated into the vehicle computer 145.

The input/output interface 755 may be configured, for example, to receive signals from various sensors of the sensor system 705, and for sending recommendations (generated by the processor 750) to the infotainment system 135 for display on the display 736.

The memory 765, which is one example of a non-transitory computer-readable medium, may be used to store a database 780, an operating system (OS) 785, and various code modules such as, for example, an off-road track data collection system module 770 and an off-road track query module 775. The code modules are provided in the form of computer-executable instructions that can be executed by the processor 750 for performing various operations in accordance with the disclosure.

More particularly, the off-road track data collection system module 770 may be executed by the processor 750 for performing various operations in accordance with the disclosure, including, for example, receiving sensor signals from the sensor system 705 and evaluating the sensor signals to obtain information about a driving surface of the off-road track 166. The processor 750 may convey the information about the driving surface, to the server computer 115 (via the input/output interface 755 and the wireless communication system 725). Evaluating the sensor signals to obtain information about a driving surface of the off-road track 166 can include actions such as those associated with generating, populating, and updating the table 200, the table 300, the table 400, and/or the table 500 described above, and can also include executing the flowchart 600 described above. The contents of the tables and other data may be stored in the database 780.

Another example operation involves the generation of a geofence extending in various directions with respect to the vehicle 125 (all around, extending in front, extending towards the rear, confined to the off-road track 166, etc.). In an example application, the geofence is defined automatically by the processor 750. In another example application, the processor 750 may generate a geofence based on input provided by the driver 120 of the vehicle 125 via the HMI of the infotainment system 135. Information pertaining to the geofence may be conveyed to the server computer 115 to enable the server computer 115 to determine a drivability status of a segment of the off-road track 166 that is defined by the geofence.

The off-road track query module 775 may be executed by the processor 750 for performing various operations in accordance with the disclosure, including, for example, sending a query to the server computer 115 (via the input/output interface 755 and the wireless communication system 725) requesting a drivability status of the off-road track 166. The request may be sent out by the vehicle 125 (or the vehicle 170) at various instances such as, for example, prior to reaching the off-road track 166 and when traversing the off-road track 166.

Figure 8:
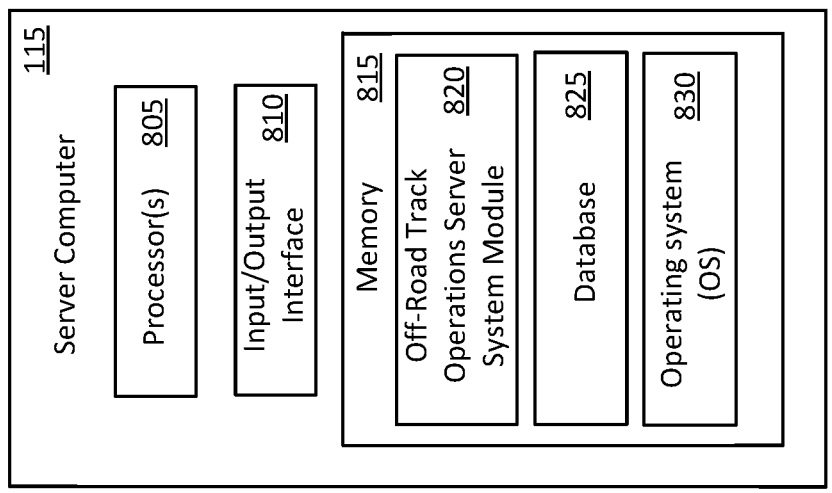
FIG. 8 illustrates some example components that may be included in a server computer in accordance with an embodiment of the disclosure.

FIG. 8 illustrates some example components that may be included in the server computer 115 in accordance with an embodiment of the disclosure. The server computer 115 may include a processor 805, an input/output interface 810, and a memory 815. The input/output interface 810 may be configured, for example, to receive signals from various devices via the network 110. The memory 815, which is another example of a non-transitory computer-readable medium, may be used to store a database 825, an operating system (OS) 830, and various code modules such as, for example, an off-road track operation server system module 820.

The code modules are provided in the form of computer-executable instructions that can be executed by the processor 805 for performing various operations in accordance with the disclosure. More particularly, the off-road track operation server system module 820 may be executed by the processor 805 for performing various operations in accordance with the disclosure, including, for example, receiving, from the off-road track operations system 150 of the vehicle 125 (and of the vehicle 170) messages, information, and/or queries.

Information received from the off-road track operation systems 150 can include, for example, information about the driving surface of the off-road track 166. Queries received from the off-road track operation systems 150 can include, for example, a query about the traversability of the off-road track 166.

Another example operation that can be performed by the processor 805 is a multifactor evaluation to determine a drivability status of the off-road track 166. Some examples pertaining to the multifactor evaluation are provided above. In an example embodiment, the drivability status of the off-road track 166 may be determined by use of the following formula:

$$(\text{Precipitation Dosage}) \times (\text{Absorbency Scalar}) = \text{Traction Loss Coefficient}$$

The precipitation dosage may be calculated on the basis of precipitation, duration, and time from previous precipitation (for example, (precipitation)×(duration)×(time from previous precipitation)=precipitation dosage). The absorbency scalar may be calculated on the basis of average temperature, daylight hours, seasonal foliage coverage due to tree beside an off-road track, and material composition of the off-road track (for example, (average temperature)×(seasonal foliage coverage)×(material composition)=absorbency scalar). The traction loss coefficient can provide information about a decay function associated with the drivability status of the off-road track 166. The decay function can provide, for example, an indication as to how soon the off-road track 166 would be traversable by a vehicle after a rainfall.

The drivability status of the off-road track 166 may be transmitted to the vehicle (for example, the vehicle 170) that sent the query to the server computer 115 about the traversability of the off-road track 166.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," or "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described. More particularly, the description provided above with respect to the vehicle 125 and the off-road track 166 is equally applicable not just to a single vehicle and a single off-road track but to multiple vehicles and multiple off-road tracks. Thus, for example, the server computer 115 may receive information from multiple vehicles about one specific off-road track (and/or multiple off-road tracks) over a period of time and may determine a drivability status of the specific off-road track (and/or of the multiple off-road tracks). The server computer 115 may also provide information pertaining to a drivability status of each of the multiple off-road tracks in a manner that allows a driver to select one of the multiple off-road tracks.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, such as the processor 750 and/or the processor 805, cause the processor to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device such as the memory 765 (and/or the memory 815), can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not in function.

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
   capturing, using a sensor of a first vehicle and as the first vehicle is traversing an off-road track, information about a driving surface of the off-road track;
   receiving, from the sensor in the first vehicle and by a remote server, the information about the driving surface of the off-road track;
   receiving, from the first vehicle, information about a type of the first vehicle, wherein the information is automatically provided by the first vehicle;
   obtaining, by the remote server, a weather forecast for an area encompassing at least a portion of the off-road track;
   determining, by the remote server and based on an evaluation procedure that includes the information about the driving surface and the weather forecast, a drivability status of the off-road track;
   receiving, from the first vehicle and by the remote server, a query about a traversability of the off-road track;
   sending, by the remote server and to the first vehicle, the drivability status of the off-road track in response to the query; and
   sending, by the remote server and to the first vehicle, an indication of a type of vehicle to be used for traversing the off-road track based on the weather forecast; and
   presenting, via a human machine interface (HMI) of the first vehicle, the indication of the type of vehicle.

2. The method of claim 1, further comprising:
   defining a geofence around the first vehicle; and
   obtaining a weather forecast for an area that includes the geofence.

3. The method of claim 2, further comprising:
   modifying the drivability status of the off-road track based on evaluating the weather forecast.

4. The method of claim 1, wherein the information about the driving surface of the off-road track comprises a material composition of the driving surface, a gradient of the driving surface, and/or an amount of traction provided by the driving surface.

5. The method of claim 1, wherein the evaluation procedure further includes identifying a model and a make of the first vehicle, identifying a speed of the first vehicle on the off-road track, identifying a location of the first vehicle on the off-road track, identifying a current weather characteristic at the location of the first vehicle on the off-road track, identifying a model and a make of a second vehicle, and/or obtaining a weather forecast for an area encompassing at least a portion of the off-road track.

6. A method comprising:
   capturing, using a sensor of a first vehicle and as the first vehicle is traversing an off-road track, a sensor signal about a driving surface of the off-road track;
   receiving, by a first processor associated with a remote server, from the sensor in the first vehicle, the sensor signal about the driving surface of the off-road track;
   receiving, from the first vehicle, information about a type of the first vehicle, wherein the sensor signal is automatically provided by the first vehicle;
   obtaining, by the remote server, a weather forecast for an area encompassing at least a portion of the off-road track;
   obtaining, by the first processor, information about a driving surface of the off-road track based on evaluating the sensor signal;
   conveying, by the first processor, to a second processor associated with the first vehicle or a personal communication device, the information about the driving surface of the off-road track, the second processor configured to determine a drivability status of the off-road track based on a multifactor evaluation procedure that includes evaluating the information about the driving surface of the off-road track and the weather forecast;
   receiving, from the first vehicle or the personal communication device, a query about a traversability of the off-road track;

sending, to the first vehicle or a personal communication device, the drivability status of the off-road track in response to the query;

defining a geofence around the first vehicle;

obtaining a weather forecast for an area that includes the geofence; and evaluating, by the remote server, the weather forecast as a part of the multifactor evaluation procedure for determining the drivability status of the off-road track, wherein the multifactor evaluation procedure further includes identifying a model and a make of the first vehicle, identifying a speed of the first vehicle on the off-road track, identifying a location of the first vehicle on the off-road track, identifying a current weather characteristic at the location of the first vehicle on the off-road track, and/or obtaining a weather forecast for an area encompassing at least a portion of the off-road track; and presenting, via a human machine interface (HMI) of the first vehicle, the indication of the type of vehicle.

7. The method of claim 6, wherein the sensor signal is produced in response to a material composition of the driving surface, a gradient of the driving surface, an amount of traction provided by the driving surface of the off-road track and/or a weather condition affecting the driving surface.

8. The method of claim 6, wherein the first processor is included in an off-road track operations system provided in the first vehicle and the second processor is included in an off-road track drivability guidance system provided in a server computer.

9. The method of claim 6, wherein the multifactor evaluation procedure for determining the drivability status of the off-road track further includes identifying a model and a make of the first vehicle, identifying a speed of the first vehicle on the off-road track, identifying a location of the first vehicle on the off-road track, and/or identifying a current weather characteristic at the location of the first vehicle on the off-road track.

10. The method of claim 6, further comprising:
defining, by the first processor and/or the second processor, a geofence around the first vehicle; and
obtaining, by the second processor, a weather forecast for an area that includes the geofence.

11. The method of claim 10, further comprising:
modifying the drivability status of the off-road track based on the weather forecast.

12. A system comprising:
a server computer comprising:
a memory that stores computer-executable instructions; and
a processor configured to access the memory and execute the computer-executable instructions to perform operations comprising:
capturing, using a sensor of a first vehicle and as the first vehicle is traversing an off-road track, information about a driving surface of the off-road track;
receiving, from the sensor in the first vehicle and by a remote server, the information about the driving surface of the off-road track;
receiving, from the first vehicle, information about a type of the first vehicle, wherein the information is automatically provided by the first vehicle;

determining, by the remote server, a drivability status of the off-road track based on a multifactor evaluation procedure that includes evaluating the information about the driving surface;

receiving, by the remote server from the vehicle, a query about a traversability of the off-road track;

providing, by the remote server, the drivability status of the off-road track in response to the query; and sending, to the vehicle, an indication of a type of vehicle to be used for traversing the off-road track based on a weather forecast; and presenting, via a human machine interface (HMI) of the first vehicle, the indication of the type of vehicle.

13. The system of claim 12, wherein the processor is further configured to access the memory and execute additional computer-executable instructions to perform operations comprising:
defining a geofence around a first vehicle; and
obtaining a weather forecast for an area that includes the geofence.

14. The system of claim 13, wherein the processor is further configured to access the memory and execute additional computer-executable instructions to perform operations comprising:
modifying the drivability status of the off-road track based on evaluating the weather forecast.

15. The system of claim 13, wherein the multifactor evaluation procedure further includes identifying a model and a make of the first vehicle, identifying a speed of the first vehicle on the off-road track, identifying a location of the first vehicle on the off-road track, identifying a current weather characteristic at the location of the first vehicle on the off-road track, and/or obtaining a weather forecast for an area encompassing at least a portion of the off-road track.

16. The system of claim 13, wherein the processor is further configured to access the memory and execute additional computer-executable instructions to perform operations comprising:
evaluating, based on the drivability status of the off-road track, a drivability of a second type of vehicle on the off-road track; and
recommending the second type of vehicle subject to the drivability exceeding a threshold reference value.

17. The system of claim 12, wherein the information about the driving surface of the off-road track comprises a material composition of the driving surface, a gradient of the driving surface, and/or an amount of traction provided by the driving surface.

18. The system of claim 12, wherein the processor is further configured to access the memory and execute additional computer-executable instructions to perform operations comprising:
obtaining a weather forecast for an area encompassing at least a portion of the off-road track;
including the weather forecast in the multifactor evaluation procedure for determining the drivability status of the off-road track; and
recommending a type of vehicle to be used for traversing the off-road track based on the weather forecast.

* * * * *